United States Patent [19]
Pfefferle

[11] Patent Number: 4,773,368
[45] Date of Patent: * Sep. 27, 1988

[54] METHOD OF OPERATING CATALYTIC IGNITION CYCLIC ENGINES AND APPARATUS THEREOF

[76] Inventor: William C. Pfefferle, 51 Woodland Dr., Middletown, N.J. 07748

[*] Notice: The portion of the term of this patent subsequent to Mar. 2, 2004 has been disclaimed.

[21] Appl. No.: 907,062

[22] Filed: Sep. 12, 1986

Related U.S. Application Data

[60] Continuation-in-part of Ser. No. 895,468, Aug. 11, 1986, which is a division of Ser. No. 526,530, Aug. 26, 1983, Pat. No. 4,646,707, which is a continuation-in-part of Ser. No. 249,075, Mar. 30, 1981, abandoned.

[51] Int. Cl.$^4$ .............................................. F02B 51/02
[52] U.S. Cl. ..................................... 123/272; 123/298; 123/670
[58] Field of Search ............... 123/668, 669, 657, 193, 123/270-272, 294, 298, 299, 670

[56] References Cited

U.S. PATENT DOCUMENTS

| | | | |
|---|---|---|---|
| 4,092,967 | 6/1978 | Haslett | 123/272 |
| 4,324,211 | 4/1982 | Strong et al. | 123/41.78 |
| 4,393,830 | 7/1983 | Bodine | 123/272 |
| 4,414,940 | 11/1983 | Loyd | 123/299 |
| 4,594,976 | 6/1986 | Gonzalez | 123/260 |
| 4,646,707 | 3/1987 | Pfefferle | 123/668 |

Primary Examiner—Charles J. Myhre
Assistant Examiner—David A. Okonsky
Attorney, Agent, or Firm—Kane, Dalsimer, Sullivan, Kurucz, Levy, Eisele and Richard

[57] ABSTRACT

Disclosed is a method of operating a catalytic ignition internal combustion engine wherein the fuel is injected into a combustion chamber at a time near maximum compression such that at least part of the fuel impinges upon an oxidation catalyst surface comprising a portion of the wall of said combustion chamber, said catalytic surface being insulated from the surroundings external to the combustion chamber by a low thermal conductivity material, said catalytic surface preferably comprising platinum. Also disclosed are combustion chambers constructed specially for the use of this method and the methods of constructing them.

9 Claims, 2 Drawing Sheets

METHOD OF OPERATING CATALYTIC IGNITION CYCLIC ENGINES AND APPARATUS THEREOF

BACKGROUND OF THE INVENTION

This application is a continuation-in-part of copending application Ser. No. 895,468 filed Aug. 11, 1986, which is a divisional of Ser. No. 526,530 filed Aug. 26, 1983, now U.S. Pat. No. 4,646,707 and which is a continuation-in-part of application Ser. No. 249,075, filed Mar. 30, 1981, now abandoned.

FIELD OF THE INVENTION

This invention relates to a method of operating cyclic fuel injected engines wherein fuel is injected into compressed air in a combustion chamber and into contact with a hot catalytic surface, such contact serving to vaporize and to ignite said fuel thus effecting more rapid combustion and minimizing formation of soot.

More specifically, this invention relates to a method of operating a catalytic ignition engine which comprises injecting fuel into compressed air in a combustion chamber. Typically the inner walls comprise chamber sides, a chamber head and the crown of a piston means, the chamber walls preferably having at least about 15% of their surface covered with a firmly affixed oxidation catalyst for ignition of fuel. The catalyst is thermally insulated to minimize or reduce heat losses through the underlying wall by a suitable underlying thermal insulation. In one embodiment the catalyst is firmly affixed to a ceramic insulation which for example may be about one mil thick having a melting point of about 3500° F. or even higher, the ceramic insulation being intimately bonded to the underlying wall. The catalyst typically comprises a noble metal or base metal oxide oxidation catalyst. Injection of the fuel is carried out such that at least part of the fuel impinges on the catalyst at about the point of maximum compression when the surface of the catalyst is hot, thereby affectibg very rapid ignition and substantially complete combustion of the fuel.

More specifically also, this invention relates to a catalytic ignition engine having a catalytic chamber and to the method of constructing the chambers, and to a piston for user in such an engine.

BRIEF DESCRIPTION OF THE PRIOR ART

Existing cyclic fuel injected engines, i.e. compression ignition engines as represented by diesel engines, achieve a significantly higher thermal efficiency than spark ignition engines in automotive use and acceptable levels of carbon monoxide and light hydrocarbons. However, soot and nitrogen oxide levels are high. Various methods for reducing soot emission have been proposed. Such methods include optimization of combustion chamber shape, controlled injection of fuel, the use of catalytic exhaust gas converters and even modification of the fuel. All have failed to satisfactorily solve the problem. Similarly, methods proposed for control of nitrogen oxides have been similarly ineffective or have resulted in unacceptable losses in fuel economy.

Use of catalysts in engine combustion chambers has previously been proposed by others. For example, Bradstreet et al (U.S. Pat. No. 2,978,860) describe a catalyst based on rare earth oxides suitable for use in the combustion chamber of spark ignition engines. Similarly, Morotski et al (U.S. Pat. No. 3,684,743) teach the use of silico-alumina coatings on the combustion chamber walls of diesel engines and claim improved fuel economy. Note that the Bradstreet coating must not cause ignition of the fuel-air mixture otherwise ignition timing by spark control would not be possible, i.e. pre-ignition or "knocking" would occur. The Morotsky coating is claimed to speed up the decomposition of fuel molecules during the preflame period and prepares the fuel for ignition, thus reducing the quantity of unsaturates in the liquid products of exhaust. Neither patent provides a coating suitable for vaporization and ignition of fuel in a fuel injected engine. Murray (ASME paper 80-DGP-44) has investigated the performance of a diesel engine using a platinum catalyst on zirconia coated combustion chamber walls and reported that ignition and combustion were delayed. Catalytic surface reactions alone are far too slow to accomplish reasonably complete combustion in gas turbines let alone in internal combustion engines.

My issued U.S. Pat. Nos. 3,923,011 and 4,011,839 teach the use of catalysts positioned within the cylinders of piston type engines to promote gas phase combustion as does Haslett's patent U.S. Pat. No. 4,092,967. Although emissions and combustion efficiency are thus improved, the presence of a catalyst in the cylinder increases resistance to the flow of gases within the cylinder and thus pumping losses. Further, because catalyst is submerged in the gas flow path, the possibility of catalyst damage is increased.

The method of the present invention overcomes the disadvantages of the prior art in that a catalytic surface induces multipoint ignition of gas phase combustion without obstruction of gas flow in the combustion chamber.

Methods of applying a catalyst to a surface, which are useful in the present invention, are known in the art. Examples are disclosed in Leak patent U.S. Pat. Nos. 3,362,783, Hindin 3,615,166 and Sergeys patent 3,903,020. The method of my U.S. Pat. No. 4,341,662 is an especially preferred method.

Methods, useful in the present invention, of applying thermal barrier coatings to the walls of internal combustion engine combustion chamber are also known in the art. For example, the methods disclosed in the U.S. Pat. No. 4,074,671 may be used.

Combustion of fuel in ordinary internal combustion engines is far too slow for maximum efficiency and may even require 40 to 50 crank angle degrees at certain engine speeds or as much as three or more milliseconds. About 20 crank angle degrees is typical for well-designed small engines. If combustion starts after top dead center, combustion will approach the constant pressure mode typical of diesel engines. As noted in the article of Kummer in the February 1975 issue of the MIT Technology Review, p. 30, such combustion does not allow full expansion of the burned gases and results in loss of both fuel economy and engine power.

In spite of the fact that the Diesel cycle is considerably less efficient than the Otto cycle, existing Diesel cycle engines, i.e. compression ignition engines as represented by the diesel engine, achieve a significantly higher thermal efficiency than present spark ignition Otto cycle engines because diesel engines operate at higher compression ratios and do not need a throttled air intake. Diesel engines also have lower emissions of carbon monoxide and light hydrocarbons than do commercial spark ignition engines, but have high emissions of soot and nitrogen oxides and usually will not burn alcohols as will spark engines.

It should be noted that spark ignition engines typically have a combustion burn time of about three milliseconds. Thus, although spark timing in spark ignition engines permits a closer approach to true Otto cycle (constant volume combustion) operation than is possible in diesel engines, combustion still requires about 20 crank angle degrees or more and typically exhibits considerable cycle to cycle variation as is shown in the figure on page 33 of the cited Kummer article. Accordingly, even the spark ignition engine departs appreciably from the Otto cycle requirement of heat addition at constant volume. In fact no conventional engine fully exploits the potential of the Otto cycle or even comes close to achieving theoretical Otto cycle efficiency.

For a compression ignition engine, such as the diesel, placing a catalyst in the line of gas flow, such as in a prechamber or in the main combustion chamber itself, offers only marginal improvement at best since turbulence and thus flame speed is reduced. This is confirmed by the reported results on a Haslett type engine published by Thring, p 133 of Platinum Metal Review, Vol 24 (1980). The need to improve fuel economy and catalyst durability are also noted.

Achievement of the full efficiency theoretically possible from an internal combustion engine requires combustion times nearly an order of magnitude shorter than even those of prior art spark ignition engines and a close approximation to true Otto cycle operation. The present invention provides a method of more rapid combustion in internal combustion engines without increasing pumping losses and is thus of considerable importance.

SUMMARY OF THE INVENTION

Definition of Terms

The terms piston and "piston means" in the present invention include not only the pistons of conventional piston engines but also the rotors of rotary engines such as the diesel Wankel and any other equivalent device. The "crown" of the piston means refers to that portion of the piston means which in use forms a wall of a combustion chamber of an internal combustion engine.

For the purpose of this invention, the term "compression ignition engine" means any cyclic combustion engine which operates with periodic injection of fuel into compressed air. The heat of compression is sufficiently high in a normal operation that combustion occurs as a result of the fuel contacting the hot compressed air and/or the hot combustion chamber walls. An example is the diesel engine. Although the invention is described herein with respect to air as the engine working fluid, it is well understood that oxygen is the required element to support combustion. Where desired, the oxygen content of the working fluid can be varied and the term "air" is used herein to refer to any free oxygen containing working fluid.

In the present invention, the term "true Otto cycle" means a periodic engine cycle in which combustion occurs at constant volume, i.e. the theoretical textbook Otto cycle. The term "Diesel cycle" in the present invention means a periodic engine in which combustion occurs at constant pressure, i.e. the theoretical textbook Diesel cycle.

DESCRIPTION OF THE INVENTION

My invention overcomes or eliminates the deficiencies of conventional Diesel type engines and of the various attempts to improve to improve these engines with catalysts, and also the limitation of Otto cycle engines to low compression ratios with near stoichiometric fuel-air mixtures and throttled air operation. According to my invention, a non-spark, compression ignition type engine with a combustion chamber is provided with an intimately bonded oxidation catalyst on the surface of the walls of the combustion chamber. The catalyst is underlaid by thermal insulation means forming part of the chamber walls to control or reduce heat loss through the walls to the surroundings. Preferably at least about 15% of the combustion chamber walls, as measured with the piston means at top dead center (TDC) are coated with a catalyst. In operation of the engine, fuel is injected such that at least part of the fuel impinges on the oxidation catalyst surface at about the time of maximum compression, which is about TDC. The timed area-wide multiple point chain reaction initiation in the turbulent environment of the combustion chamber causes very rapid and substantially complete combustion which is closer to Otto cycle than Diesel cycle performance in that a sharp combustion pressure wave occurs in the immediate vicinity of top dead center. Combustion even may be so close to instantaneous (of the order of 200 microseconds) that the combustion pressure wave approximates true Otto cycle operation. Inasmuch as combustion according to my invention occurs faster even than in conventional spark-ignited so-called Otto cycle engines, for practical purposes the combustion of my invention is instantaneous. The resulting engine operation is substantially quieter than that of a Diesel engine with the noticeable absence of the typical Diesel clatter. The engine combustion chambers so constructed, engines incorporating such chambers, the method of constructing the chambers, and the pistons for use in the engine are also part of my invention.

In my invention, ignition of the fuel by the catalyst surface is believed to result from surface oxidation of a minor amount of the fuel, thus increasing the local temperature and propelling ignited fuel away from the surface. It is also believed that the catalyst injects radical species into the gas phase. Such species are known to speed up combustion. For effective ignition according to the process of my invention, the catalyst temperature is as high or nearly as high as the temperature for auto-ignition of the fuel used, and preferably higher because a hotter catalyst promotes faster ignition of gas phase combustion. Although such catalysts are known to oxidize fuels on the surface at much lower temperatures, even as low as liquid nitrogen temperatures in the case of certain precious metal catalysts with hydrogen as the fuel, the time required for the catalyst to reach the fuel ignition temperature may be too long for operation of an engine. At catalyst temperatures below those required for fuel ignition, the presence of a catalyst can even delay gas phase combustion. This result is believed to stem from quenching by the relatively cold surface of radicals generated in the gas phase. It has long been known that such quenching of free radicals is promoted by active catalyst surfaces. Wetting of a porous catalyst surface by fuel also would be expected to delay ignition. Thus the mere presence of a catalytic oxidation catalyst not only does not guarantee catalytic ignition but is reported as being disadvantageous. In the present invention the catalyst is maintained at a sufficiently high temperature for ignition of the fuel. Moreover, it is preferred that the catalyst be sufficiently nonporous so as to be substantially non-wettable by fuel at engine operating conditions.

In certain engines using my invention, such as large slow speed engines (e.g. locomotive engines) or engines operating at relatively low compression ratios, it may be difficult to conveniently maintain the catalyst at a high enough temperature for rapid ignition of gas phase fuel combustion although at more than a sufficient temperature for ignition of surface oxidation reactions. In such engines, the catalyst may be brought up to the required temperature by a suitable heat source such as a pilot injection of fuel which is surface oxidized consuming no more than about 5% of the oxygen in the compressed air present in the combustion chamber. Such pilot injection should preceed injection of the fuel charge to be ignited and should preferably terminate no later than about 15 crank angle degrees before the point of maximum compression (top dead center), or more preferably 20 or even 25 degree before top dead center.

BRIEF DESCRIPTION OF THE DRAWINGS

This invention can be further understood with reference to the drawings in which.

DETAILED DESCRIPTION OF THE INVENTION AND PREFERRED EMBODIMENTS

Figure 1:
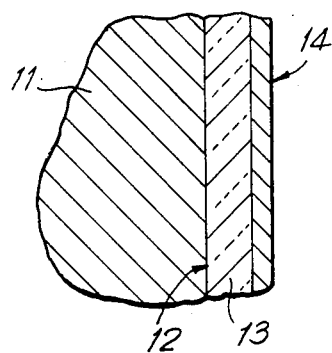
FIG. 1 is an enlarged fragmentary cross-sectional view showing how the catalytic coating is bonded to the thermal insulating coating.

The present invention is further described in connection with the drawings. Conventionally, the inner surface 12 of combustion chamber wall 11 is coated with a thermal insulating coating 13, preferably a ceramic coating, as seen in FIG. 1. A useful thermal insulating coating is comprised of zirconium oxide with 6% by weight yttrium oxide for stabilization of the crystal structure. According to the invention, a catalytic coating 14 is bonded to the thermal insulating coating 13. The catalytic coating, which preferably comprises a noble metal catalyst such as platinum chemically bonded to the thermal insulating coating, facilitates vaporization of fuel drops and ignition of the vaporized fuel. This ignition is believed to result from the heat generated by the oxidation of small amounts of fuel on the catalyst surface. The thermal insulating coating 13 permits the intimately bonded catalyst to operate at high enough temperature to be effective in this function. The thermal insulating coating 13 must therefore be of sufficient thickness, typically at least about 1 to 10 mils thick. Coatings thicker than 10 mils permits use of less active catalysts but may be subject to thermal shock damage and thus less durable. Coatings thinner than 1 mil may be used if supplemented with one or more thermal breaks in the underlying wall, as described below. The vaporization and ignition action of the catalyst results from the combined effects of fuel, air, and catalyst at or above a sufficiently high temperature. The thermal insulating coating 13 allows combustion heat and compression heat during operation of the engine to maintain the catalyst at operational temperatures.

Figure 6:
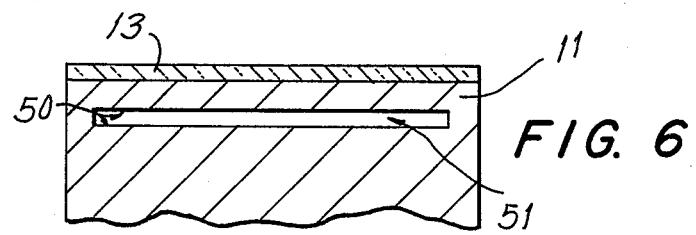
FIG. 6 is an enlarged fragmentary cross-sectional view showing an air barrier thermal break in the wall underlying a catalyst coated thermal insulating layer.

Advantageously, the thermal insulating coating 13 may be supplemented by one or more thermal breaks such as air barrier 51 in the wall underlying catalyst coating 14, as shown in FIG. 6. Alternately, the thermal break can comprise as alternate sections or layers of ceramic and metal. The air barrier thermal break may be any discontinuity in a combustion chamber wall such as the gas film between abutting or spaced apart plates, the gas bubbles in foamed ceramics or metals, or an evacuated space within the wall. Preferably, at least one of the surfaces 50 defining air barrier 51 is infrared reflective and advantageously bears a flash coating of gold. This thermal break helps to maintain a high catalyst temperature thereby permitting the engine to operate at relatively low compression ratios. The ceramic insulating coatings can be as thin or thinner than one mil and/or use less active ignition catalysts. With a plurality of air barrier thermal breaks, the ceramic insulating layer may advantageously be as thin as 0.1 mil with resultant superior thermal shock tolerance.

Compression of the air raises its temperature and this rise may be sufficient even to start the engine especially if alcohol is the fuel or if the compression ratio is high enough for the engine to start-up as for a diesel engine. If needed at initial start-up, a conventional electrical glow plug or other heat source may be used to start the engine. Start-up heat, as a non-igniting heat source during catalytic operation, may also be supplied by heating the inlet air to the engine either with an electrical heater or by combustion of fuel in the air intake.

Figure 2:
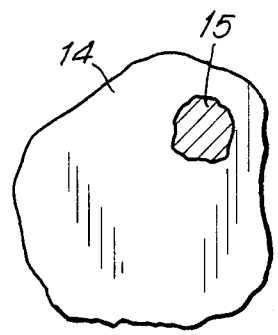
FIG. 2 is a face view of the section of FIG. 1, showing a small uncatalyzed area of the thermal insulating coating.

The catalytic coating is applied over a portion of the thermal insulating coating 13. It may be advantageous that certain areas 15 of thermal insulating coating or layer 13 be left uncoated as shown in FIG. 2, because fuel consumption on a catalyzed area heats the adjacent uncatalyzed area raising the temperature of the uncatalyzed area thereby facilitating ignition of fuel vapor and flame propagation throughout the combustion chamber. This patterned coating of the catalyst can be particularly advantageous at lower catalyst temperatures such as at idling, especially with thinner thermal layers.

Figure 3:
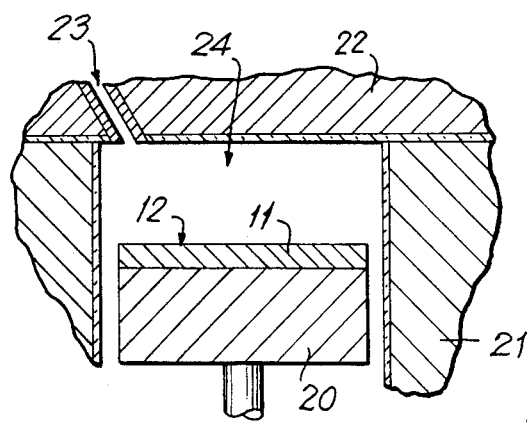
FIG. 3 is a sectional view of a typical arrangement of modified piston in a cylinder of a direct injection catalytic ignition engine.
Figure 5:
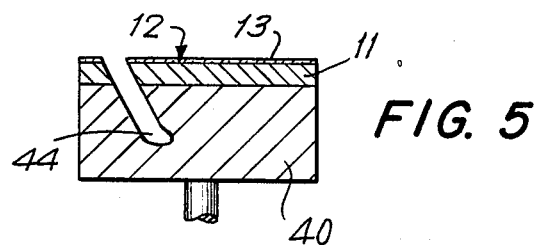
FIG. 5 is a sectional view of an alternate modified piston for use in the engine of FIG. 3.

One preferred embodiment of the invention, generally indicated as in FIG. 3, is the combustion chamber 24 of a direct injection engine. Piston 20 is of composite structure. Combustion chamber wall 11 is in the form of a stainless steel face plate to permit higher catalyst operating temperatures with minimum thickness of thermal insulating coating 13 on the surface 12 (see FIG. 1) facing the interior of combustion chamber 24. Where desired, the combustion chamber surfaces of head 22 may have a thermal insulating (thermal barrier) coating and said coating may be coated with catalyst. Fuel injector 23 is positioned such that the fuel spray impinges on the catalyst coating on surface 12. Alternately, piston 40 with air cell auxiliary chamber 44, shown in FIG. 5, may be used in place of piston 20. As with piston 20, piston 40 is of composite structure with chamber wall 11 in the form of a stainless steel face plate with insulating coating 13 on surface 12. Using piston 40, fuel injector 23 is positioned such that substantially all or the major portion of the fuel spray is advantageously directed into air cell 44 and fuel injection terminated prior to the top dead center position of piston 40. Fuel and air are ejected from air cell 44 during the expansion stroke, contacting the catalyst coating on surface 12 close to top dead center. This results in exceptionally rapid combustion and is a preferred embodiment for high speed engines in that a sharp combustion pressure wave occurs in the immediate vicinity of top dead center even with a relatively simple fuel injection system.

Figure 4:
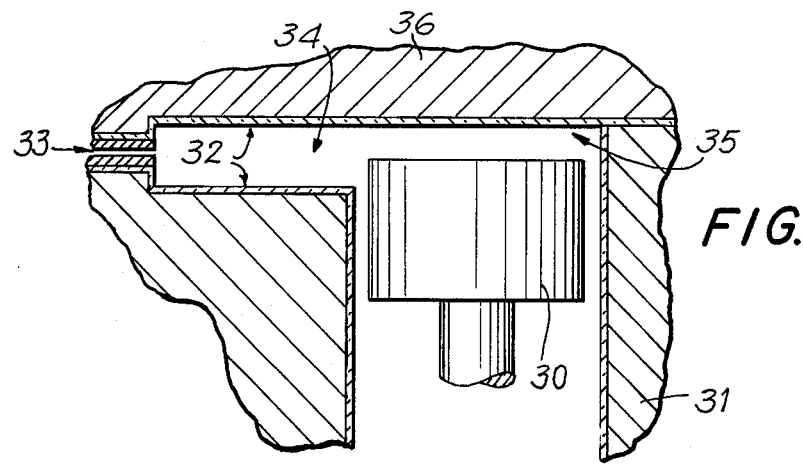
FIG. 4 is a sectional view of a typical arrangement of a modified combustion chamber for a prechamber catalytic ignition engine.

Another preferred embodiment of the combustion chamber is the prechamber 34 as an auxiliary chamber to secondary chamber 35 generally indicated in FIG. 4. Piston means 30 operates in the cylinder defined by cylinder wall 31 and at top dead center displaces most of the air in secondary combustion 35 into chamber 34. Head 36 defines one wall of both chambers 34 and 35. Interior surfaces 32 of auxiliary combustion chamber 34 are coated with a thermal barrier and catalyst as in the case of surface 12 shown in FIGS. 1 and 3. Fuel injector 33 is positioned such that fuel spray impinges on the catalyst coating on surfaces 32. Prechamber 34, FIG. 4, is preferably isolated from the inlet and exhaust gas flows to minimize cooling during the inlet and exhaust strokes.

An auxiliary chamber, such as air cell 44 or prechamber 34, offers many advantages in engine design. Uncatalyzed auxiliary chambers, as for example air cell 44, enable the use of simpler fuel injection systems and even may be cooled, thus reducing the work of compressing the air during the compression stroke. Ignition of fuel injected into an uncatalyzed auxiliary chamber may thus be inhibited from igniting prior to contact with the catalyst. Auxiliary chambers with catalyzed walls also offer many advantages. Catalyzed auxiliary chambers, such as prechamber 34, are more readily maintained at a high temperature because the flow of the cold inlet air during the inlet stroke need not pass through the auxiliary chamber. This permits design of small high speed engines with low idle speeds. Morever, combustion can be timed not only by injection directly into a catalyzed auxiliary chamber, as shown in FIG. 4, but alternatively by injection of the fuel into the secondary combustion chamber during the latter portion of the compression stroke and displaced or injected into the auxiliary chamber by the piston means during or in the latter portion of the compression strokes.

In the engine of the present invention, thermal insulation means underlies the catalyst surface. That is, the catalyst surface is insulated to minimize or reduce heat loss or heat flux through the walls to the external surroundings. A suitable insulating means comprises a ceramic material as part of the interior combustion chamber walls. Without suitable insulation means underlaying the catalytic surface, the latter would cool rapidly between firings and ignition would not be close to instantaneous. With metal combustion chamber walls, ceramic insulation also protects the underlaying metal surface against oxidation at operating temperatures and thus allows the metal wall to operate at high temperatures, permitting use of high efficiency thermal breaks within the metal walls. If the chamber walls are provided with air barriers as a thermal break, the ceramic thermal insulation permits high catalyst operating temperatures even at low engine speeds. Stabilized zirconia is a preferred material for the thermal barrier layers because of its high melting point, but other materials known in the art may be used, including stabilized hafnia, urania, thoria, alumina, and compounds thereof, and silicon nitride and spinels. Silicon nitride is especially useful for light weight piston crowns. A porous surface is more easily wet by impinging fuel thereby prolonging completion of combustion. Therefore it is preferred that the catalyst surface and the surface layer of the ceramic insulation be of sufficicently low porosity to minimize or inhibit wetting. However, high porosity beneath the surface of the insulation improves insulation efficiency and therefore reduces heat loss.

High melting point insulating materials are required. Catalytic surfaces exposed to the flame in the combustion chamber will reach very high temperatures; and the insulating material in contact with the catalytic surfaces typically should have melting points in excess of 3500° F. or even more preferably in excess of 4000° F. The thermal insulating layer is at least one mil thick to achieve adequate thermal insulation of the catalytic surface. Thicknesses greater than ten mils permit the use of less active catalysts but the insulation can be sensitive to thermal shock damage and such greater thicknesses are not preferred unless thermal shock tolerant ceramic is used. Similarly, the use of all ceramic pistons or other all ceramic components is not presently recommended because suitable tough, thermal shock resistant materials are not now commercially available. Nevertheless, all ceramic combustion chamber walls can be used for the ceramic thermal insulating layer of this invention. Thermal shock tolerant inserts or liners also may be used.

Inasmuch as present internal combustion engines are typically constructed of metals, the thermal insulation of the present invention has been described in terms of coating on combustion chamber walls. In the present invention, the term "thermal insulating coating" includes any ceramic surface layer, whether a layer applied by any applicable coating technique or whether the surface layer of a composite ceramic structure. For metal structures, it has been found that flame spraying makes possible thermal insulating coatings as thick as ten or fifteen mils which are remarkably stable under thermal cycling in a combustion environment. At least about 15% and more preferably about 25% of the combustion chamber walls, i.e. 15% and more preferably 25% of the inner surface or area of said walls as measured with the piston means at top dead center, is covered with the thermal insulating coating. The coating can be on the crown of a piston means and/or on the walls or the head of the cylinder. Although typical insulating materials are catalytically inactive, such materials can be doped with catalytic substances to render them catalytically active for oxidation of fuels. Thus, the thermal insulating materials of this invention include catalytic materials such as nickel doped stabilized zirconia and the high melting point perovskite oxidation catalysts known in the art. If only the piston crown is to have catalyst, at least about 40% of the piston crown is covered with a ceramic insulating coating to provide a total coverage of about 15% on the combustion chamber walls. Although not required for this invention, essentially complete coverage of all combustion chamber surfaces with ceramic insulation is preferred, since this reduces heat losses. The term "stabilized zirconia or hafnia" includes the partially stabilized materials.

In one specific aspect of this invention, as explained above, at least about 15% of the combustion chamber walls, as measured with the piston means at top dead center, is occupied by a catalyst active for the rapid oxidation of fuels. Preferably, the catalyst is chemically bonded to the surface of the insulation. A surface catalytic coating is advantageous in that the most effective thermal barrier coating can be used irrespective of catalytic properties. Moreover, this permits patterned catalyst coatings containing small uncoated areas, preferably less than about 50% of the catalyst coated areas, thereby reducing the amount of catalyst required. Fuel contacting such uncoated areas promotes rapid flame propagation away from the surface and thus contribute to the near instantaneous combustion of the whole fuel-air mixture. Fuel impinging on the catalyst is oxidized and provides heat for propagation of flame away from both catalyst coated areas and adjacent uncoated areas.

The catalyst preferably comprises a noble metal such as iridium or platinum, especially the latter. It can, however, comprise nickel or cobalt or other catalytic elements known in the art to be active for fuel oxidation. The catalysts used preferably have a melting point of at least 3000° F. Perovskite oxidation catalysts of suitable melting point are known in the art and may be used. A preferred composition for use in coating stabilized zirconia is as follows:

a. 2 gm platinum metal in the form of chloroplatinic acid
b. 1 gm aluminun nitrate
c. 5 cc zirconyl nitrate solution in water containing about 1.5 gms zirconyl nitrate A method suitable for applying the oxidation catalyst coating of this invention is shown by the following example. The inner surfaces 12 of combustion chamber 24 are previously coated with an yttria stabilized zirconia by conventional flame spraying to a thickness of about 5 mils. The surface to be coated is cleaned if necessary by vapor degreasing to assure freedom from dirt, oil or grease. Suitable masks are employed on areas 15 where no catalyst coating is desired.

A catalyst coating is applied comprising chloroplatinic acid, zirconyl nitrate and aluminum nitrate, preferably in aqueous solution taking care not to contaminate the coating. This material may be applied by brushing in one or more light even coats to prevent runnning. After each coat is applied it is dried in a forced circulation over at about 200° F. for fifteen minutes at heat and then at approximately 300° F. for thirty minutes.

After the final cost is dried, any mask material is carefully removed and the coated part is cured by heating gradually to 1300° F. and holding at that temperature for one hour.

The catalytic coating, applied as described, has the film or layer of catalytic metal (i.e. platinum) chemically bonded to the thermal barrier layer. Any thermal barrier material can be coated using various catalyst compositions. However, sufficiently nonporous catalyst coatings are most readily obtained if the surface of the thermal barrier layer is nonporous or of low porosity. For replacement pistons, at least about 40% of the piston crown is preferably occupied by the catalyst on top of the thermal insulation to assure that catalyst occupies at least about 15% of the combustion chamber surface.

The minimum compression ratio of engines used in this invention will vary depending on the fuel. For example methanol and ethanol can be used as fuels for the present invention at compression ratios as low as 10 or 12/1. Methane may require ratios above 16/1. Higher than minimum compression ratios promote ease of starting and therefore are advantageous. Further, because the catalyst does not contribute to pumping losses, the maximum thermal efficiency is obtained at compression ratios greater than 14/1.

In the method of this invention an engine is operated in a conventional manner except that fuel is ignited by contact with a hot catalytic surface. Thus, aromatic fuel containing about 30 percent or even 50 percent or more aromatic hydrocarbons by weight may be used as well as conventional diesel fuels. Unleaded gasoline and alcohols are especially suitable fuels. In the method of this invention compression ratios in excess of 30/1 are feasible allowing improved fuel economy and ease of starting at subzero ambient temperatures. The preferred compression ratio is most often in the range of about 10/1 to about 25/1. However, inasmuch as ignition of fuel is solely a function of a sufficiently high catalyst temperature, with adequate thermal insulation a compression ratio as low as 8/1 or even 6/1 is feasible. This means that even though present rotor seal technology limits Wankel engines to a compression ratio of no more than 10 or 11/1 for reliable operation, it is nevertheless possible to build a reliable unthrottled fuel injected Wankel engine by utilizing the catalytic ignition technology of the present invention.

An engine of 32/1 compression ratio, utilizing a combustion chamber of the type shown in FIG. 3 with a catalyst coating comprising platinum, is operated using unleaded gasoline as a fuel. Thermal efficiency is high and no soot is visible in the exhaust. The test illustrates surface initiated area wide combustion by contact of a hydrocarbon fuel with a catalyst to approximate true Otto cycle performance from a non-spark internal combustion engine (true Otto cycle performance requires combustion proceeding to completion before any movement of the piston mean occurs).

In the following tests, the test engine was a Hatz E673 single cylinder air cooled Diesel engine having a compression ratio of 19/1 and a maximum power output of 5 HP at 3600 RPM. The piston has a small air cell in its crown into which fuel is injected prior to the top dead center position of the piston. To monitor cylinder pressure, a Kistler piezoelectric transducer was installed in the cylinder head and connected to an oscilloscope. All tests were run on a single batch of commercial automotive Diesel fuel with the engine connected to a small dynamometer to provide a load for the engine. At 2300 RPM, it was observed that the combustion pressure wave approximated the Diesel cycle constant pressure mode, starting at about top dead center and ending at about 20 crank angle degrees after top dead center for a duration of about 1.5 milliseconds. At 3300 RPM, it was observed that the combustion wave persisted even further into the expansion stroke. During operation, the typical Diesel engine clatter was noted. On disassembly of the engine after the tests, the piston was found to be coated with soot.

In a subsequent test, the same procedure was followed using the same engine but with a different piston which had been modified by attaching to its crown a stainless steel plate with a stabilized zirconia coating of about ten mils with a platinum coating bound thereto (as described elsewhere in these specifications). A matching hole in the plate was aligned with the opening of the air cell in the piston so that the air cell could function as in the tests with the unmodified piston. The piston crown was machined prior to attaching said steel plate so that the dimensions of the piston with plate attached were about the same as those of an unmodified piston. On installing the modified piston, the cylinder head gasket was adjusted to make sure that the clearance between the head and the piston crown was not less than in the previous tests. On operation of the engine at 2500 RPM, using the same batch of fuel as in the previous tests, the combustion pressure wave was observed to closely approximate true Otto cycle performance with a sharp increase in cylinder pressure occuring just after top dead center and in less than about 0.2 milliseconds, i.e. within about three crank angle degrees. At 3300 RPM, a similar Otto cycle type pressure wave was observed. Much less noise was heard during the operation of the engine than in the tests with the standard piston. On disassembly of the engine after the test, the piston was observed to be free of soot.

It should be noted that combustion time in a Diesel engine is a function of cylinder size and design. The larger cylinders of larger engines typically require increased time for complete combustion and operate at slower speed than do smaller engines. The Hatz engine used in the above tests is quite small and showed combustion times comparable to those of spark engines, yet still exhibited Diesel cycle type combustion as would the retarded spark operation of a spark ignition engine. Still, even in this engine, the use of the catalytic ignition of this invention produced a combustion time roughly an order of magnitude shorter, so short in fact that the combustion pressure wave approximated true Otto cycle operation more closely that even the typical spark ignition engine.

The present invention can be applied to most existing fuel injected compression ignition engine designs. Even most existing diesel engines can readily be modified to operate in accordance with the present invention. This is important since the future of the automotive diesel engine is being threatened by the diesel's high emissions of soot and by limited availability of diesel fuel. Further the present invention that it overcomes the limitations of the prior art inventions by providing a catalytic method which provides efficient combustion without the increased pumping losses of in cylinder catalysts or the risks of damage to the engine. Still further this invention permits the use of a wide range of fuels, even those of low cetane number. In addition it is possible to obtain low levels of noxious emissions in combination with exceptionally high thermal efficiency. Also, a compression ignition type engine with can be operated with ignition characteristics more like and in fact superior to those of a spark ignition engine.

I claim:

1. A method of operating a catalytic ignition engine having a combustion chamber provided with at least one auxiliary chamber communicating with said combustion chamber, which comprises;
    (a) heating an ignition catalyst comprising at least a portion of the walls of said combustion chamber to a temperature high enough to be effective for vaporization of fuel drops and ignition of vaporized fuel;
    said catalyst being thermally insulated to minimize heat losses through said wall portion;
    said catayst being subsequently maintained at operating temperature by combustion heat;
    (b) compressing air in said combustion chamber;
    (c) injecting fuel into said compressed air and into said auxiliary chamber;
    (d) impinging a least a portion of said fuel with said heated catalyst at a time near maximum compression;
    (e) and initiation of a timed area-wide multiple point chain reaction being ignited by said heated catalyst resulting in instantaneous and substantially complete combustion which is closer to Otto cycle than to Diesel cycle performance in that a sharp combustion pressure wave occurs in the immediate vicinity of top dead center.

2. The method according to claim 1 wherein said auxiliary chamber comprises an air cell, and including injecting at least the major portion of said fuel into said air cell during said compressing, and ejecting said mixed fuel and air from said air cell during the expansion onto said heated catalyst.

3. The method according to claim 1 wherein said auxiliary chamber is provided with said catalyst and including injecting at least a portion of said fuel directly into said auxiliary chamber.

4. The method according to claim 1 wherein said auxiliary chamber is provided with said catalyst and including displacing at least a portion of said fuel into said auxiliary chamber during the latter portion of said compressing.

5. The method according to claim 1 including applying said catalyst to said wall portion as a patterned coating.

6. The method according to claim 1 wherein said catalyst comprises a noble metal and said thermal insulation comprises a ceramic, said catalyst being intimately bonded to said ceramic.

7. The method according to claim 2 including the step of cooling the air in said auxiliary chamber during said compressing.

8. A method of operating a catalytic ignition engine having a combustion chamber which comprises:
    (a) compressing air in said combustion chamber,
    (b) heating an oxidation catalyst surface comprising at least a portion of the walls of said combustion chamber by injecting a pilot portion of fuel into said compressed air, and into contact with said catalyst, said pilot portion being sufficient to consume no more than about 5% of the oxygen in said compressed air to heat said catalyst to a temperature high enough for ignition of said fuel, and
    (c) injecting additional fuel into said combustion chamber at a time near the point of maximum compression and igniting said additional fuel by contact with said heated catalyst.

9. The method according to claim 8 including an auxiliary chamber communicating with said combustion chamber and injecting fuel into said auxiliary chamber during said compressing.

* * * * *

UNITED STATES PATENT AND TRADEMARK OFFICE
CERTIFICATE OF CORRECTION

PATENT NO. : 4,773,368
DATED : September 27, 1988
INVENTOR(S) : William C. Pfefferle It is certified that error appears in the above-identified patent and that said Letters Patent is hereby corrected as shown below:

Column 1, line 40, "affectibg" should read -- effecting --.

Column 1, line 45, "user" should read -- use --.

Column 9, line 48, "cost" should read -- coat --.

Signed and Sealed this

First Day of August, 1989

Attest:

DONALD J. QUIGG

Attesting Officer

Commissioner of Patents and Trademarks